(12) United States Patent
Gore

(10) Patent No.: US 7,270,865 B2
(45) Date of Patent: *Sep. 18, 2007

(54) BLACK LEUCO DYES FOR USE IN CD/DVD LABELING

(75) Inventor: Makarand P. Gore, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 489 days.

This patent is subject to a terminal disclaimer.

(21) Appl. No.: 10/365,186

(22) Filed: Feb. 10, 2003

(65) Prior Publication Data

US 2004/0147399 A1 Jul. 29, 2004

Related U.S. Application Data

(63) Continuation-in-part of application No. 10/351,188, filed on Jan. 24, 2003, now Pat. No. 6,974,661.

(51) Int. Cl.
*B41M 5/30* (2006.01)
*B32B 3/02* (2006.01)

(52) U.S. Cl. .............. 428/64.4; 430/270.11; 503/209; 503/220; 503/221

(58) Field of Classification Search .............. 428/64.4; 503/208, 209, 221
See application file for complete search history.

(56) References Cited

U.S. PATENT DOCUMENTS

| | | | |
|---|---|---|---|
| 4,742,042 A | 5/1988 | Hiraishi et al. | |
| 5,236,884 A | 8/1993 | Boggs et al. | |
| 5,250,493 A | 10/1993 | Ueda et al. | |
| 5,688,592 A * | 11/1997 | Shibahashi et al. | 428/323 |
| 5,876,898 A * | 3/1999 | Ikeda et al. | 430/203 |
| 6,290,138 B1 | 9/2001 | Ohno et al. | |
| 6,329,035 B1 | 12/2001 | Iwasaki et al. | |
| 6,362,130 B1 | 3/2002 | Hotta et al. | |
| 6,894,000 B2 * | 5/2005 | Bhambra | 503/201 |

FOREIGN PATENT DOCUMENTS

| | | |
|---|---|---|
| EP | 0381492 | 8/1990 |
| EP | 0659583 | 6/1995 |
| JP | 58094494 | 6/1983 |
| JP | 08039935 | 2/1996 |
| JP | 2000330359 | * 10/2000 |
| JP | 2002216396 | 8/2002 |
| WO | WO 02/96663 | 5/2002 |
| WO | WO 03/032299 | 4/2003 |

* cited by examiner

*Primary Examiner*—Bruce H. Hess

(57) ABSTRACT

Systems and methods of labeling optical disk recording media using black leuco dyes in an electromagnetic radiation sensitive composition are described. Black leuco dyes containing isobenzofuranone are prepared in various compositions that can include activators, radiation absorbers, non-leuco colorants, and/or a variety of carriers. The leuco dye compositions can be applied and prepared to achieve a desired visual effect upon development of the black leuco dye.

43 Claims, 1 Drawing Sheet

BLACK LEUCO DYES FOR USE IN CD/DVD LABELING

PRIORITY INFORMATION

This application is a continuation-in-part of U.S. patent application Ser. No. 10/351,188, filed Jan. 24, 2003 now U.S. Pat. No. 6,974,661, which is incorporated herein by reference.

FIELD OF THE INVENTION

The present invention relates generally to applications of leuco dyes. More particularly, the present invention relates to using black leuco dyes for labeling of a substrate.

BACKGROUND OF THE INVENTION

Optical disks represent a significant percentage of the market for data storage of software as well as of photographic, video, and/or audio data. Typically, optical disks have data patterns embedded thereon that can be read from one or both side(s) of the disk, and a graphic display printed on the other side of the disk. The data readable side, or data side, of the disk contains a spiral track of variably spaced depressions, called pits, separated by undepressed surface called land. A low-powered laser is focused onto the spiral track. The height difference between pits and lands creates a phase shift in the reflected beam that may be measured and translated into usable data. Various optical disk formats are currently available such as CD, CD-ROM, CD-R, CD-RW, DVD, DVD-R and DVD-RW. Other optical disk formats are also available.

In order to identify the contents of the optical disk, printed patterns or graphic display information can be printed on the non-data side of the disk. The patterns or graphic display can be both decorative and provide pertinent information about the data content of the disk. In the past, commercial labeling has been routinely accomplished using screen-printing methods. While this method can provide a wide variety of label content, it tends to be cost ineffective for production of less than about 400 disks because of the fixed costs associated with preparing a stencil or combination of stencils and printing the desired pattern or graphic display.

In recent years, the significant increase in use of optical disks for data storage by consumers have increased the demand to provide customized labels to reflect the content of the optical disk. Most consumer available methods of labeling are limited to either handwritten descriptions and pre-printed labels which may be affixed to the disk but may also adversely affect the disk performance upon spinning at high speeds.

SUMMARY OF THE INVENTION

It has been recognized that it would be advantageous to develop alternative systems and methods for labeling a substrate, such as an optical disk.

In one embodiment, an optical disk in accordance with embodiments of the present invention can comprise an optical disk substrate having an electromagnetic radiation sensitive composition coated thereon. The electromagnetic radiation sensitive composition can comprise a leuco dye capable of forming a black image upon development, wherein the leuco dye is an isobenzofuranone-containing dye. The electromagnetic radiation sensitive composition can also comprise an activator configured for reaction with the leuco dye. The electromagnetic radiation sensitive composition can also comprise an electromagnetic radiation absorber admixed with or in thermal contact with the leuco dye, which is thermally active under the influence of electromagnetic radiation sufficient to facilitate the reaction.

The invention also includes a system for labeling a substrate, comprising an image data source, a substrate having an electromagnetic radiation sensitive composition coated thereon, and a radiation source for developing the electromagnetic radiation sensitive composition. The electromagnetic radiation sensitive composition can comprise a leuco dye which is capable of forming a black image upon development, such as an isobenzofuranone-containing dye. Additionally, the composition can comprise an activator configured for reaction with the leuco dye and an electromagnetic radiation absorber admixed with or in thermal contact with the leuco dye, which is thermally active under the influence of electromagnetic radiation sufficient to facilitate the reaction. The electromagnetic radiation source can be operatively connected to the image data source and configured to direct electromagnetic radiation to the electromagnetic radiation sensitive composition.

In another embodiment, a method for labeling an optical disk can comprise a series of steps. One step includes applying an electromagnetic radiation sensitive composition to a surface of an optical disk, wherein the composition comprises a black leuco dye, an activator, and an electromagnetic radiation absorber, the leuco dye being an isobenzofuranone-containing dye. A second step can comprise transferring image data from a data source to an electromagnetic radiation source configured to produce electromagnetic radiation. A third step can comprise inducing a color change in at least a portion of the electromagnetic radiation sensitive composition by exposure to the electromagnetic radiation at a predetermined frequency, intensity, time, and spot size to produce a visible image on the optical disk.

Additional features and advantages of the invention will be apparent from the detailed description which follows, taken in conjunction with the accompanying drawings, which together illustrate, by way of example, features of the invention.

DETAILED DESCRIPTION

Figure 1:
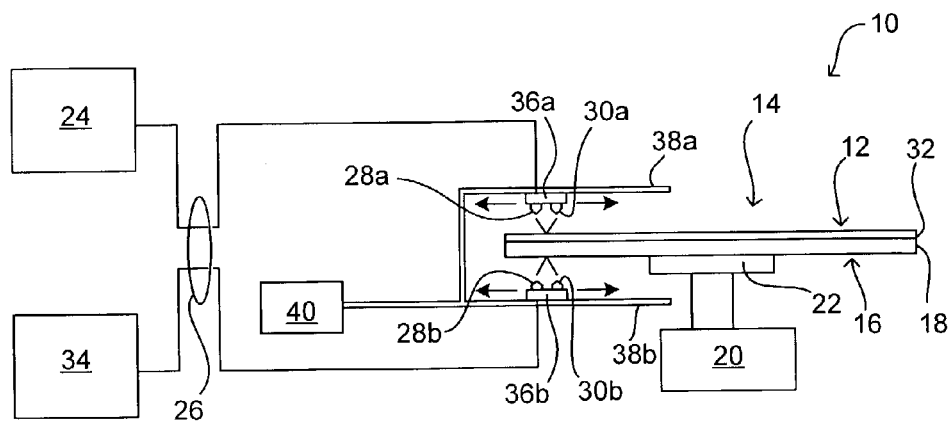
FIG. 1 is a schematic diagram of a system for labeling a substrate in accordance with embodiments of the present invention.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein, as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a leuco dye" includes reference to one or more of such materials.

As used herein, "optical disk" is meant to encompass audio, video, multi-media, and/or software disks that are machine readable in a CD and/or DVD drive, or the like. Examples of optical disk formats include writeable, recordable, and rewriteable disks such as DVD, DVD-R, DVD-RW, DVD+R, DVD+RW, CD, CD-ROM, CD-R, CD-RW, and the like. Other like formats may also be included, such as similar formats and formats to be developed in the future.

As used herein, "graphic display" can include any visible character or image found on an optical disk. Typically, the graphic display is found prominently on one side of the optical disk, though this is not always the case.

As used herein, "data" is typically used with respect to the present disclosure to include the non-graphic information contained on the optical disk that is digitally or otherwise embedded therein. Data can include audio information, video information, photographic information, software information, and the like.

As used herein, "isobenzofuranone-containing" refers to any chemical compound suitable for use in the present invention and which includes the sub-group:

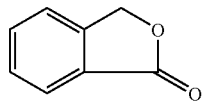

As used herein, "leuco dye" refers to a dye in a form which is, prior to development, substantially colorless or white, and which blackens upon exposure to heat. The color-altering phenomenon is typically due to a chemical change, such as through oxidation, resulting from heat exposure.

The term "activator" refers to a composition that is interactive or reactive with leuco dyes upon introduction of heat.

As used herein, "developing" or "development" refers to the interaction or reaction of a leuco dye with another agent, such as an activator, to produce a visible composition having a desired color. The interaction is most often thermally initiated, but may also be physical in nature.

As used herein, "absorber" refers generally to an electromagnetic radiation sensitive agent that can generate heat upon exposure to a predetermined frequency of electromagnetic radiation. The predetermined frequency can be different from one absorber composition to the next. When admixed with or in thermal contact with a leuco dye and/or activator, an absorber can be present in sufficient quantity so as to produce heat sufficient to at least partially develop the leuco dye in accordance with embodiments of the present invention. Typically, development of the leuco dye can result from interaction between the leuco dye and an activator composition.

The term "thermal contact" refers to the spatial relationship between an absorber and a leuco dye-activator composition. For example, when an absorber is heated by interaction with electromagnetic radiation, the heat generated by the absorber should be sufficient to cause the leuco dye to blacken through reaction with the activator. Thermal contact can include close proximity between an absorber and a leuco dye, which allows for heat transfer from the absorber toward the leuco dye and/or activator. Thermal can also include actual contact between an absorber and a leuco dye, such as in immediately adjacent layers, or in an admixture including both constituents.

"Carrier" or "carrier component" is defined to include compositions and additives that can be used with leuco dyes, absorbers, and/or activators to form one or more layers on the surface of a substrate. Surfactants, polymers, UV curable materials, and the like can be used as a carrier. A combination of leuco dye and absorber can be within a common carrier, or can be in separate carriers to be applied to a substrate sequentially. Additives, such as colorant, can be added to the carrier in some embodiments.

As used herein, "optical density" refers to the logarithm of the reciprocal of reflectance, where reflectance is the ratio of reflected power to incident power.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 μm to about 200 μm should be interpreted to include not only the explicitly recited concentration limits of 1 μm to about 200 μm, but also to include individual concentrations such as 2 μm, 3 μm, 4 μm, and sub-ranges such as 10 μm to 50 μm, 20 μm to 100 μm, etc.

As illustrated in FIG. 1, a system for labeling a substrate having a black leuco dye thereon, indicated generally at 10 in accordance with the present invention, is shown. In this embodiment, the system can simultaneously write to the image side 12 of an optical disk 14 and collect and/or write data to the data side 16 of the optical disk. The optical disk substrate 18 is shown in a first orientation, with the image side 12 facing in an upward direction. A motor 20 and a support member 22 are present for spinning and supporting the optical disk 14.

In accordance with the present invention, an image is digitally stored on image data source 24. This image information can be generated using any number of commercially available image software programs. The image can then be rasterized or spiralized and delivered to a labeling electromagnetic radiation source via signal processor 26. This process generally involves digitizing image data to correspond to a spiral path that matches the path followed by the electromagnetic radiation source with respect to the image side of the optical disk while spinning. In one embodiment, the labeling electromagnetic radiation source is an emitting device 28a and an optional label detecting device 30a facing the image side 12 of the spinning optical disk 14 having a leuco dye composition 32 thereon. Additionally, an optional second emitting device 28b and a second detecting device 30b face the data side 16 and are configured for simultaneous reading and/or writing operations. The data can be generated, used, and/or stored in data source 34. In one embodiment, data can be written by sending it to the second emitting device 28b via signal processor 26. Each set of emitters and detectors are positioned on a first sled 36a and a second sled 36b, respectively. Additionally, the first sled 36a and the second sled 36b follow a first track 38a and a second track 38b, respectively. In this embodiment, a single solenoid 40 is shown that acts to simultaneously cause both the first sled 36a and the second sled 36b to travel and collect information in unison. However, this is not required.

In an alternative embodiment, each sled can be configured to be independent of the other. In such an embodiment, the use of two solenoids or other mechanical or electrical structures can be implemented for independent function. Additionally, other embodiments are possible such as using a single track and solenoid combination such as those available in common CD-R/CD-RW drives. The same emitter and diode combinations could be used to read and write data and then the disk could be inverted and a black image could be developed using the leuco dyes of the present invention.

Figure 2A:
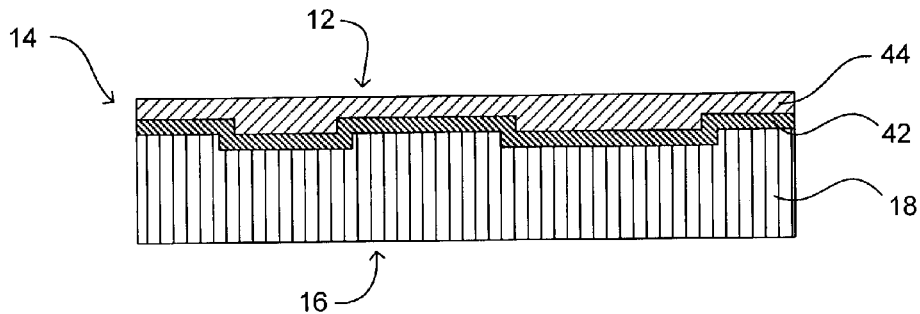
FIGS. 2A, 2B and 2C are cross-sectional views of a portion of an optical disk according to several exemplary embodiments of the present invention.
Figure 2B:
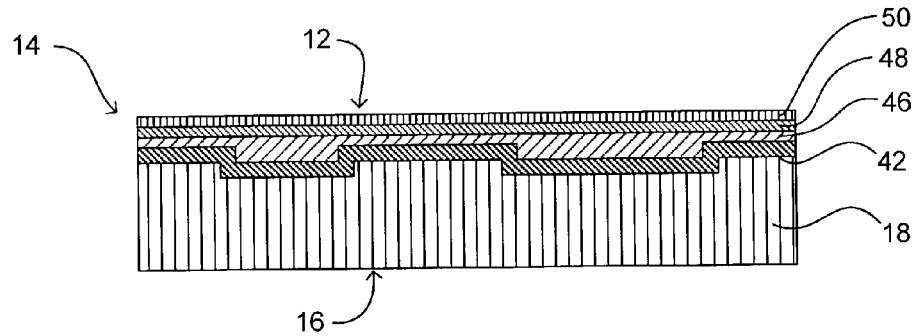
Figure 2C:
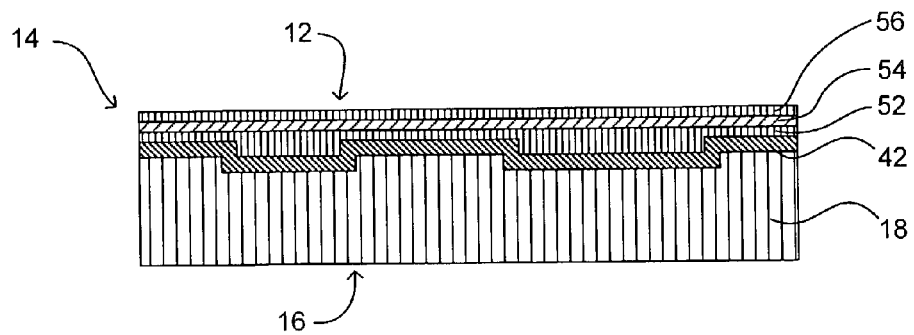

The present invention relates generally to labeling a substrate using specific black leuco dyes. As illustrated in FIGS. 2A, 2B and 2C an optical disk, shown generally at 14, includes a substrate 18 having various coatings is shown. The substrate 18 is generally used for structural support and has a data side 16 and a label side 12. The substrate 18 can be made of any suitable material such as a polycarbonate for optical disks or other polymeric materials. A data layer 42 is generally formed by sputtering or other known processes and can contain any known materials capable of creating, maintaining, and/or mimicking pits and lands corresponding to specific data. Thus, though a single data layer is shown, it is understood that multiple layers can be used, such as for writable and/or rewritable formats. As such materials for use in creating permanent (ROM), writable, or rewritable formats are well known to those skilled in the art. These materials include, but are not limited to, aluminum, cyanine, phthalocyanine, metallized azo dyes, and photosensitive compounds in a polymer binder in a dye layer. For example, rewritable optical disks typically include a quaternary phase-change alloy exhibiting different reflective properties in the amorphous and crystalline states. The data layer can also contain colorants which do not affect the data storage performance of the data layer. The above compositions are readable or writable as to the data side 16 of the optical disk 14.

The black leuco dyes and activators of the present invention can be prepared and applied in a variety of ways to a data readable or writable optical disk. For example, as shown in FIG. 2A, an electromagnetic radiation sensitive composition 44 can be prepared containing the black leuco dye, an activator, an electromagnetic radiation absorber, and a carrier. The carrier can include surfactants and/or polymeric materials such as Almacryl® T-500, polyacrylate from monomers and oligomers, polyvinylalcohols, cellulose esters, polyvinyl pyrrolidines, polyethylenes, polyphenols or polyphenolicesters, polyurethanes, etc. As the electromagnetic radiation sensitive composition of the embodiment shown is to provide not only leuco dye and activator function, but is also used to protect the top surface of the disk, various additional components, such as lubricants, surfactants, and materials imparting moisture resistance, can also be added to provide mechanical protection to the electromagnetic radiation sensitive composition.

In an alternative embodiment, electromagnetic radiation absorber can be applied in a separate layer with respect to a leuco dye layer, wherein the separate layer is placed on the substrate either before or after the leuco dye. FIG. 2B shows a leuco dye layer 46 containing a black leuco dye and activator in a suitable carrier. This composition is formed on the data layer 42, and can cover the entire surface or merely a portion of the optical disk 14. In the embodiment shown in FIG. 2B, an absorber layer 48 can be formed as a separate layer (using an absorber in a carrier), which covers at least a portion of the optical disk. Thus, the leuco dye layer 46 and the absorber layer 48 collectively make up the electromagnetic radiation sensitive composition. In one embodiment, in order for the leuco dye composition 46 to be developed as desired on the optical disk surface, the absorber layer 48 can be formed on at least approximately the same portions of the optical disk 14 as the leuco dye layer 46. This provides an optical disk having the absorber layer 48 in thermal contact with the leuco dye layer 46. If the two layers are not in actual contact, but are close enough in proximity for thermal activation of the leuco dye to occur, the layers can also be said to be in thermal contact. An optional passive protective layer 50 can be formed to add mechanical protection to the leuco dye layer 46 and absorber layer 48. The protective layer may be substantially transparent or translucent such that sufficient electromagnetic radiation is allowed to pass therethrough, allowing for development of the electromagnetic radiation sensitive composition.

In yet another alternative embodiment of the present invention, FIG. 2C depicts an optical disk 14 having a substrate 18, a data layer 42, and a first protective layer 52. An electromagnetic radiation sensitive composition layer 54 can be prepared to include a leuco dye, an activator, an electromagnetic radiation absorber, and a carrier(s), as discussed above, having either the absorber and leuco dye with activator in separate layers or admixed together. The first protective coating layer 52 protects the data layer 42, as is typical for writable and rewritable optical disks currently being sold commercially. A second protective coating layer 56 protects the electromagnetic radiation sensitive composition layer(s) 54. Such protective coatings can be coatings including lacquers, UV coats, or polymeric films.

With respect to each of the embodiments enumerated in the Figures, as well as with respect to equivalent embodiments, black leuco dyes suitable for use in the present invention are isobenzofuranone-containing dyes. Generally, leuco dyes are substantially colorless and are in a lactone closed ring form. Such dyes can be leuco fluoran dyes such as 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, and 3-pyrrolidino-6-methyl-7-anilinofluoran. The corresponding chemical structures are shown, respectively, as follows:

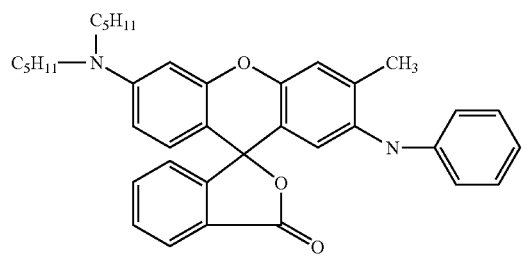

-continued

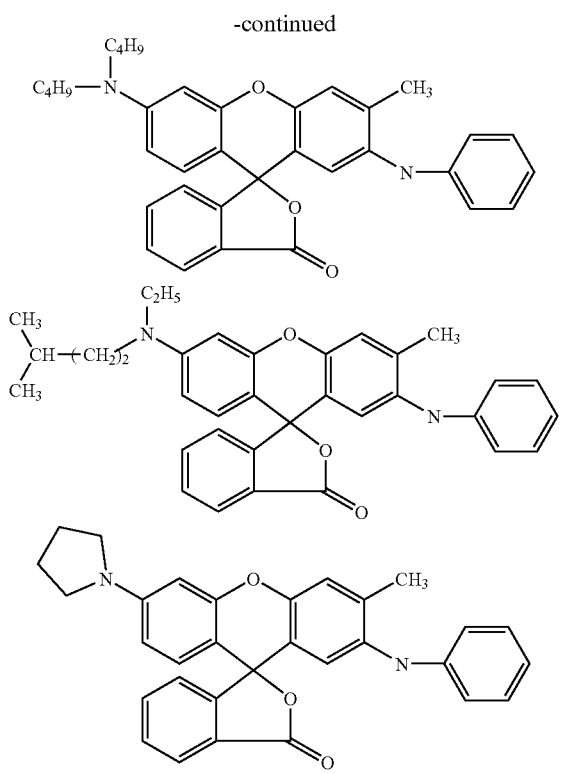

Leuco dyes containing halides such as halide isobenzofuranone leuco dyes can also be used in the present invention. One example of a halide-containing isobenzofuranone leuco dye is the tetra-halide composition 1(3H)-isobenzofuranone, 4,5,6,7-tetrachloro-3,3-bis[2-[4-(dimethylamino)phenyl]-2-(4-methoxyphenyl)ethenyl], which has the following structure:

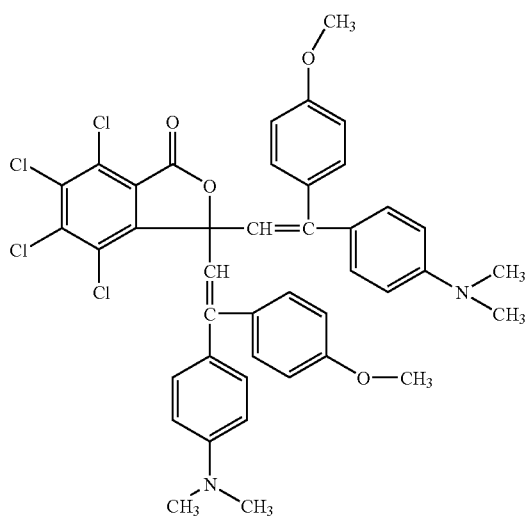

Upon heat-induced oxidation, protonation, ring-opening, or the like, in the presence of an activator, the above-recited isobenzofuranone-containing leuco dyes can form black dyes having a high optical density. Although a wide range of compositions are suitable for use in the present invention an electromagnetic radiation sensitive composition may contain less than about 60% by weight of leuco dye and activator, and is preferably about 40% by weight. These ranges are only exemplary and other weight ranges may be used depending on the desired image characteristics and other considerations. Activator to leuco dye weight ratios of between about 1:4 and 4:1 typically provide adequate results and a ratio of about 2:1 may also be used.

As stated, interaction between a leuco dye and an activator can cause a chemical change in the leuco dye, thereby altering the color of the leuco dye from substantially white or colorless to substantially black. Generally, the chemical change in the leuco dye occurs upon application of a predetermined amount of heat. Activators suitable for use in the present invention can be chosen by those skilled in the art. Several non-limiting examples of suitable activators include phenols, carboxylic acids, lewis acids, oxalate complexes, succinate acid, zinc stearate, and combinations thereof.

As the predermined amount of heat is provided by the electromagnetic radiation absorber, matching of the electromagnetic radiation frequency and intensity to the absorber used can be done to optimize the system. The absorber can be present in the electromagnetic sensitive leuco dye composition in an amount of typically between about 0.001% and about 10% by weight, although other weight ranges may be required depending on the activity of the particular absorber. Examples of frequencies that can be selected include infrared, visible, ultraviolet, or combinations thereof.

The absorber can be configured to be in a heat-conductive relationship with the isobenzofuranone-containing leuco dye. For example, the absorber can be placed in the same layer as the isobenzofuranone-containing leuco dye as part of an admixture, or can be in a separate layer. Thus, the absorber can be admixed with or in thermal contact with the leuco dye composition. In one aspect of the present invention, the absorber can be applied to the substrate in a separate adjacent layer prior to or after applying the leuco dye composition as a layer. In one embodiment, consideration can also be given to choosing the activator such that any light absorbed in the visible range does not adversely affect the graphic display or appearance of undeveloped leuco dye. Although an inorganic compound can be used, the absorber typically can be an organic compound, such as, but not limited to, infrared absorbers, ultraviolet absorbers, and visible light absorbers. More specifically, examples of absorbers suitable for use in the present invention include, but are not limited to metal complex IR dyes, indocyanine green, heterocyclic compounds and combinations thereof. Metal complex IR dyes can be used such as dithiolane metal complexes having the general formula

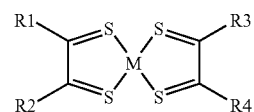

where M can be a transition metal, and R1–R4 can be lower alkyl or aryl groups. Indoaniline metal complexes can also be suitable such as the following compound

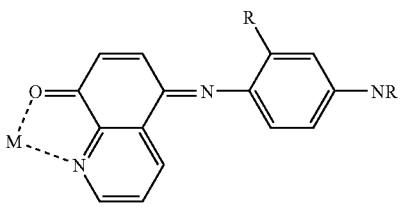

where M can be Ni, Cu, or another transition metal, and each R can independently be H, lower alkyl, and/or aryl. Several commercial IR absorber compounds such as IR780 and IR783 (available from Aldrich Chemical Company) and dithiophenylidene compounds (Syntec 9/1 and Syntec 9/3), shown below respectively, can also be used in the present invention.

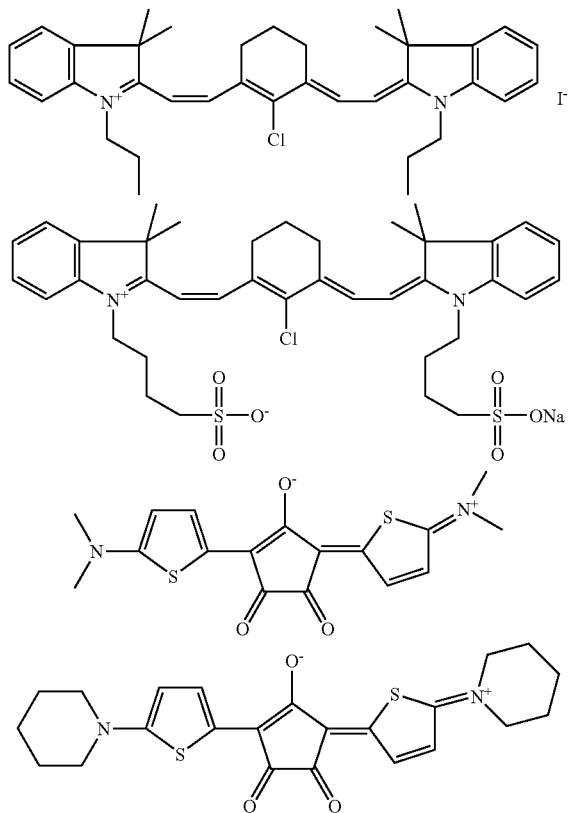

Other suitable absorbers can also be used in the present invention and are known to those skilled in the art and as found in such references as "Infrared Absorbing Dyes", Matsuoka, Masaru, ed., Plenum Press, New York, 1990 (ISBN 0-306-43478-4) and "Near-infrared Dyes for High Technology Applications", Daehne, Resch-Genger, Wolfbeis, Kluwer Academic Publishers (ISBN 0-7923-5101-0), both incorporated herein by reference. Although, the specific activators and absorbers discussed herein are separate compounds such activity can also be provided by constituent groups of a leuco dye which incorporates the activation and/or radiation absorbing action within the leuco dye molecule.

In accordance with another aspect of the present invention, the black isobenzofuranone leuco dyes can be developed under conditions of exposure to specific types of electromagnetic radiation, including electromagnetic radiation produced using a laser. Lasers are available which produce radiation in visible, infrared, and ultraviolet frequencies. For example, lasers having frequencies anywhere from about 650 nm to about 815 nm are readily commercially available.

The conditions under which the leuco dyes of the present invention are developed can be varied. For example, one can vary the electromagnetic radiation frequency, heat flux, and exposure time. Variables such as spot size and laser power will also affect any particular system design and can be chosen based on the desired results. With these variables, the electromagnetic radiation source can direct electromagnetic radiation to the electromagnetic radiation sensitive composition in accordance with the image data source and information received from the signal processor. Further, leuco dye and/or activator concentration and proximity to one another can also be varied.

The leuco dyes of the present invention can be developed using lasers having from 15 to 100 mW power usage, although lasers having a power outside this range can also be used. The spot size can be determined by considering the electromagnetic radiation source, and can range from about 1 to about 200 µm, though smaller or larger sizes can also be used. In one embodiment, a radiation spot size of between about 10 and about 60 µm can also be utilized. In a further aspect, spot sizes of 20 by 50 µm can provide a good balance between resolution and developing speed.

Heat flux is a variable that can be altered as well, and can be from about 0.05 to 1 $J/cm^2$ in one embodiment, and from about 0.05 to 0.4 $J/cm^2$ in a second embodiment. Heat flux in these ranges allow for development of leuco dyes in less than about 1000 microsec per dot in some embodiments, less than about 500 microsec per dot in other embodiments, and 100 microsec or less per dot in still other embodiments.

To illustrate an example where these variables can be brought together in a single embodiment, a standard CD image surface containing the leuco dye composition and activator can be developed using a spot size of 20 by 50 µm, a 35 mW laser, and 100 microsec exposure per dot in about 20 minutes. The black images produced in accordance with this embodiment can have a high optical density of above about 1.3. Optical densities of about 1.4 or greater can also commonly be achieved. Those skilled in the art can adjust these variables to achieve a variety of resolutions and developing times.

Other variations can also be implemented, including the adding of a non-leuco colorant to impart additional desired color to the image. For example, the use of an opacifier pigment or other non-leuco colorant can be used to provide background color to the optical disk. The non-leuco colorants can be added to the electromagnetic radiation sensitive composition layer (which can include an activator layer and leuco dye layer, or can be an admixture of the two layers in a single layer), or the protective layer(s), as long as the development of the leuco dye is not adversely effected. Portions of the black leuco dye can then be developed producing a black image with a colored background. Examples of opacifiers include calcium carbonate, titanium dioxide, and other known opacifiers. Additionally, examples of other non-leuco colorants include dyes or other pigments. In other words, if a colored background is desired that will remain independent of leuco dye development, an opacifier pigment, other pigment, and/or dye can be admixed in the carrier to impart the desired color.

In preparing the black-forming leuco dyes, such dyes can be prepared in solution which is substantially transparent or translucent. Any suitable carrier such as a surfactant can be used which is compatible with the particular black leuco dye chosen. When the black leuco dye is prepared in a solution form, it may be desirable to underprint a colored coating over at least a portion of the substrate beneath the leuco dye solution. The optional colored coating produces a background color that is visible underneath the solution layer. This colored coating can contain various non-leuco colorants such as other pigments and/or dyes. Alternatively, a non-leuco colorant may be added to the data layer to produce the desired background color. As with the dispersion, the activator can be admixed within the solution or coated onto the substrate either before or after the solution is coated thereon. If a background color is pre-printed, such coatings and compositions can be applied to the substrate using any of a variety of known techniques such as screen-printing, spin coating, sputtering, or spray coating. Each coating can be applied and then dried sequentially.

EXAMPLES

Example 1

About 5 g of ground 4-benzyloxy benzoate containing 0.05% IR783 activator powder was dissolved in 15.3 g of an ultraviolet curable mixture of acrylate monomers and oligomers (available under the tradename NOR-COTE CDG000 UV-lacquer) to form a solution. Next, 14.5 g of 2'-anilino-3'-methyl-6'-(dibutylamino)fluoran (BK-400 leuco dye available from Nagase Co., Ltd.) having the structure:

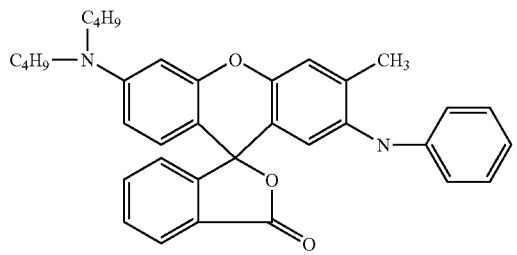

and having an average particle size of less than about 5 μm was added to the solution. As an activator, 1.9 g of pure bisphenol-A having an average particle size of less than about 5 μm was added to the solution. The solution was rendered to a fine paste and screen-printed onto a substrate at a thickness of approximately 7 μm to form an imaging medium. The coating on the medium was then cured using ultraviolet radiation from a mercury lamp.

The leuco dye-containing layer produced was developed with a 45 mW laser at 780 nm. A mark of approximately 20 μm×45 μm was produced with exposure times of about 20 μsec to 100 μsec. The developed image was produced without the use of a printing intermediary, and exhibited high optical density.

Example 2

About 2 g of dibenzyl oxalate powder was heated to about 85° C., which was sufficient to cause melting of the powder. To the melted powder was added 20 g of phenol,4,4'-sulfonylbis(2-(2-propenyl)) activator (available under the tradename TG-SA) having the structure:

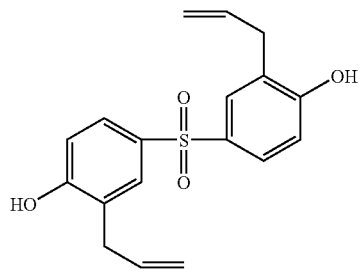

and 1.2 g of IR absorber IR780. The resulting composition was cooled and ground into a fine powder. Next, 1.8 g of the ground fine powder was dissolved in 15.3 g NOR-COTE CDG000 UV-lacquer as a carrier to form a solution. Next, 15 g of black leuco dye ((2-anilino-3-methyl-6-(N-ethyl-N-isoamylamino)fluorine) available from Nagase Co., Ltd., under the tradename S-205, having the structure:

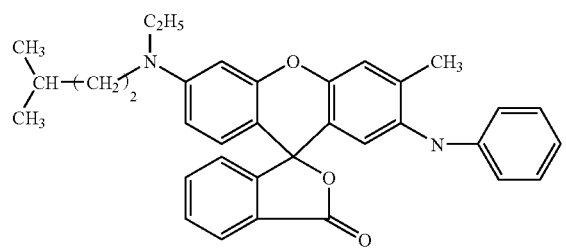

was added to the solution. The black leuco dye had an average particle size of less than about 5 μm. In addition, 2.0 g of pure bisphenol-A having an average particle size less than about 5 μm was added to the solution to form a mixture. The mixture was rendered to a fine paste and screen-printed onto a substrate at a thickness of approximately 7 μm to form an imaging medium. The coating on the medium was then cured using ultraviolet radiation from a mercury lamp.

The leuco dye was then developed on the resulting coated substrate with a 45 mW laser at 780 nm. A mark of approximately 20 μm×45 μm was produced with exposure times of about 60 μsec to 100 μsec. The developed image was produced without the use of a printing intermediary, and provided an image having high optical density.

Example 3

Indocyanine Green (1.5 grams of a 10% solution) in de-ionized water was mixed thoroughly with 50 g of screen-printing paste, commercially available from Savoir Faire, Novato, Calif., under the tradename LASCAUX to form a paste mixture. Approximately half the paste mixture was combined with 17 g of milled black leuco dye (S205 as in Example 2). The leuco dye had been previously milled to an average particle size of less than 5 μm in a water slurry and dried to approximately 50% solids. The paste mixture and leuco dye were then thoroughly mixed on a roller mill. The remaining portion of the paste mixture was then combined with 33 g of benzyl 4-hydroxybenzoate and thoroughly mixed. The benzyl 4-hydroxybenzoate was prepared by milling the particles to an average particle size less than 11 µm and drying to approximately 50% solids. The resulting combined mixture was then roll-milled to thoroughly homogenize the components and to decrease the average particulate diameter. The resulting mixture measured an average fineness of less than 2 µm. The viscosity of the mixture was also measured to be between 50,000 and 160,000 cps at 1 rpm wherein the slope of the curve for 10 rpm/1 rpm was greater than 5.0. The mixture was screen coated onto one side of a CD and dried under a vacuum at 45° C.

The leuco dye was then developed on the CD substrate using a 45 mw laser at 780 nm for a 280 microsecond exposure time. The image printed on the CD showed high optical density black marks approximately 25×50 microns in dimension, and had a green background.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. An optical disk, comprising an optical disk substrate having an electromagnetic radiation sensitive composition coated thereon for labeling the optical disk substrate, said electromagnetic radiation sensitive composition comprising:
   a) a leuco dye capable of forming a black image upon development, said leuco dye being an isobenzofuranone-containing dye;
   b) an activator configured for reaction with the leuco dye; and
   c) an electromagnetic radiation absorber admixed with or in thermal contact with the leuco dye, which is thermally active under the influence of electromagnetic radiation in the form of a laser sufficient to facilitate the reaction.

2. An optical disk as in claim 1, wherein the leuco dye is a leuco fluoran dye.

3. An optical disk as in claim 1, wherein the leuco dye is a halide-containing isobenzofuranone leuco dye.

4. An optical disk as in claim 1, wherein the electromagnetic radiation is within a frequency selected from the group consisting of visible, ultraviolet, infrared, and combinations thereof.

5. An optical disk as in claim 4, wherein the activator is selected from the group consisting of phenol, carboxylic acid, lewis acid, oxalate complex, succinate acid, zinc stearate, and combinations thereof.

6. An optical disk as in claim 4, wherein the absorber is admixed with the leuco dye, said absorber being thermally active at the frequency of the electromagnetic radiation.

7. An optical disk as in claim 4, wherein the electromagnetic radiation absorber is included in a first layer, and wherein the leuco dye and activator are included in a second layer, said second layer being configured with respect to the first layer such that the absorber is in thermal contact with the leuco dye upon activation by the frequency of the electromagnetic radiation.

8. An optical disk as in claim 1, wherein the electromagnetic radiation sensitive composition further comprises a carrier.

9. An optical disk as in claim 1, wherein the electromagnetic radiation sensitive composition further comprises a non-leuco colorant.

10. An optical disk as in claim 1, further comprising a non-leuco colored layer coated on at least a portion of the optical disk substrate under the electromagnetic radiation sensitive composition.

11. An optical disk as in claim 1, further comprising a protective transparent layer placed over the electromagnetic radiation sensitive composition.

12. An optical disk as in claim 1, wherein the leuco dye is selected from the group consisting of:

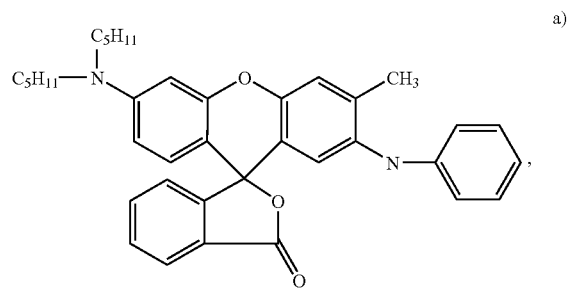

a)

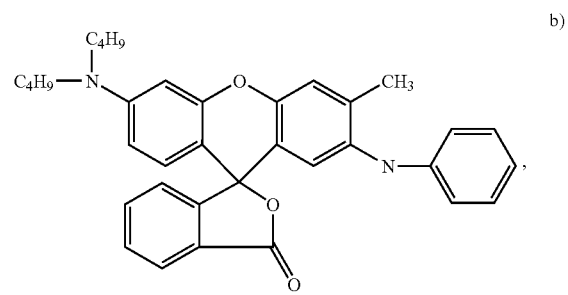

b)

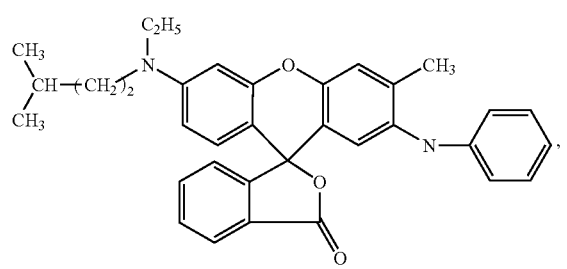

c)

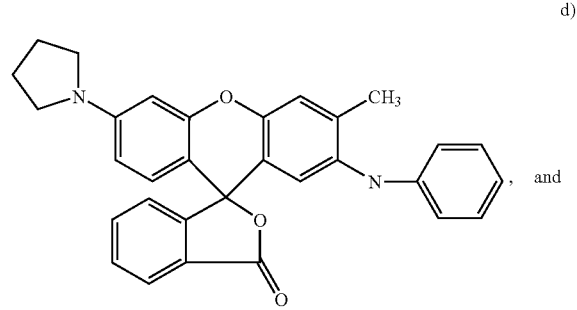

d)

, and

-continued e)

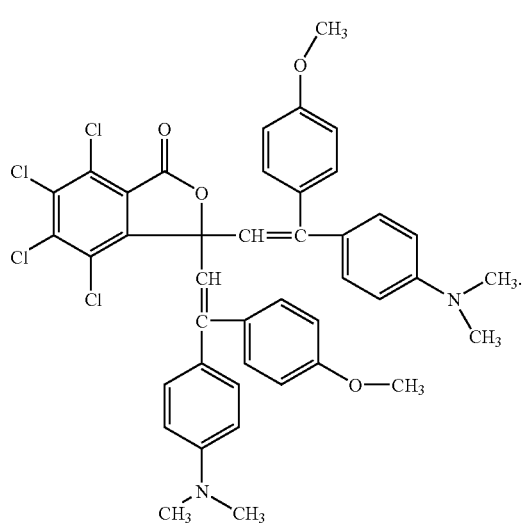

13. An optical disk as in claim 1, wherein the electromagnetic radiation absorber includes a dithiolane metal complex, indoaniline metal complex,

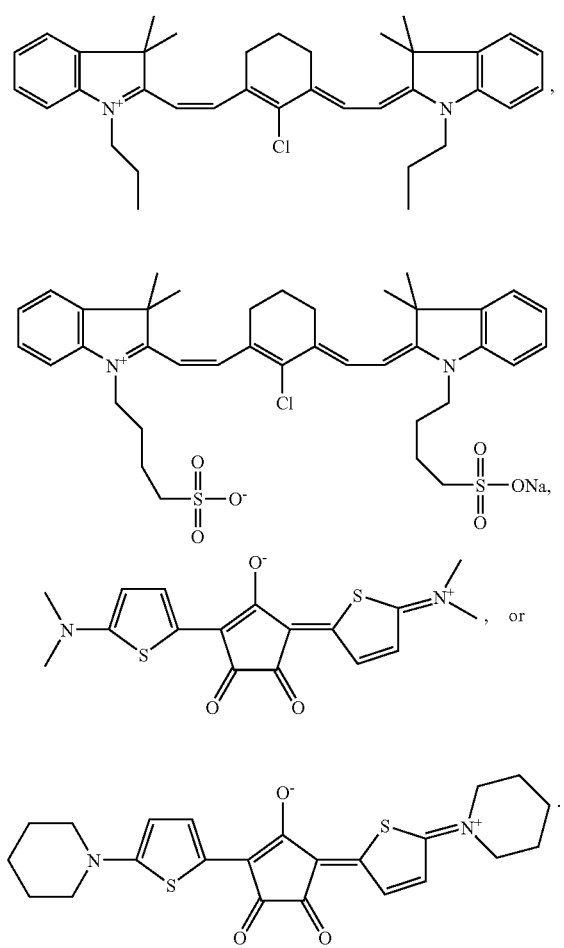

14. A system for labeling a substrate, comprising:
   a) an image data source;
   b) a substrate having an electromagnetic radiation sensitive composition coated thereon for labeling of the substrate, said electromagnetic radiation sensitive composition comprising:
      i) a leuco dye which is capable of forming a black image upon development, said leuco dye being an isobenzofuranone-containing dye;
      ii) an activator configured for reaction with the lueco dye; and
      iii) an electromagnetic radiation absorber admixed with or in thermal contact with the leuco dye, which is thermally active under the influence of electromagnetic radiation sufficient to facilitate the reaction; and
   c) an electromagnetic radiation source operatively connected to the image data source and configured to direct laser electromagnetic radiation to the electromagnetic radiation sensitive composition.

15. A system as in claim 14, wherein the leuco dye is a leuco fluoran dye.

16. A system as in claim 14, wherein the leuco dye is a halide-containing isobenzofuranone leuco dye.

17. A system as in claim 14, wherein the leuco dye is selected from the group consisting of:

a)

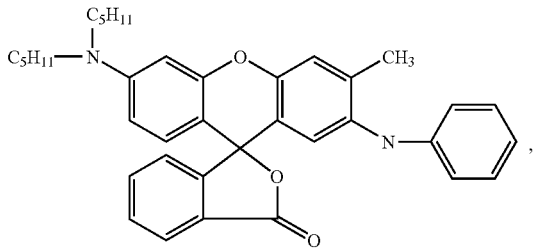

b)

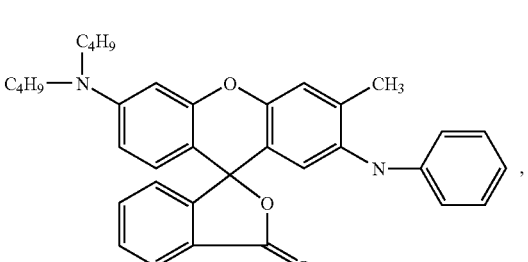

c)

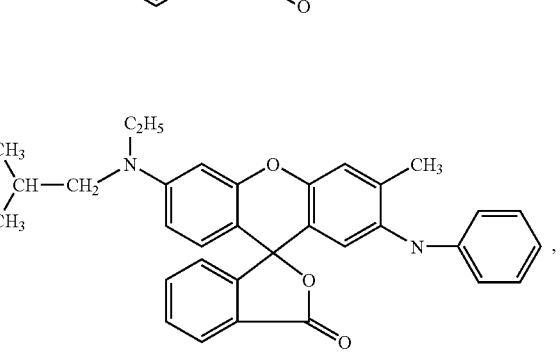

-continued d)

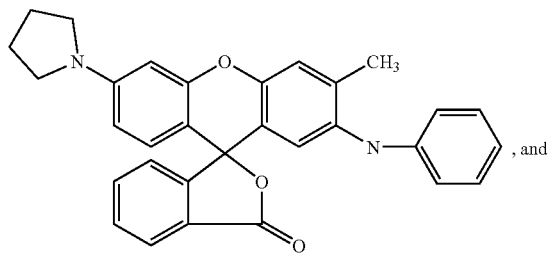

e)

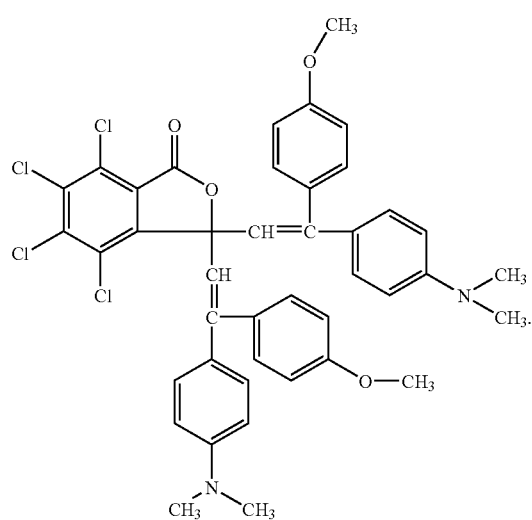

18. A system as in claim 14, wherein the electromagnetic radiation is within a frequency selected from the group consisting of visible, infrared, ultraviolet, and combinations thereof.

19. A system as in claim 14, wherein the electromagnetic radiation source is in the form of a laser source capable of producing a heat flux from 0.05 to 1.0 J/cm².

20. A system as in claim 14, wherein the black image has an optical density of at least 1.3.

21. A system as in claim 14, wherein the electromagnetic radiation sensitive composition further comprises a non-leuco colorant.

22. A system as in claim 14, wherein the substrate has a colored layer underprinted beneath the electromagnetic radiation sensitive composition.

23. A system as in claim 14, wherein the substrate is an optical disk.

24. A method for labeling an optical disk, comprising the steps of:
   a) applying an electromagnetic radiation sensitive composition to a surface of an optical disk; wherein the composition comprises a black leuco dye, an activator, and an electromagnetic radiation absorber, the leuco dye being an isobenzofuranone-containing dye;
   b) transferring image data from a data source to an electromagnetic radiation source configured to produce laser electromagnetic radiation; and
   c) inducing a color change in at least a portion of the electromagnetic radiation sensitive composition by exposure to the laser electromagnetic radiation at a predetermined frequency, intensity, time, and spot size to produce a visible image on the optical disk.

25. A method for labeling an optical disk as in claim 24, wherein the black leuco dye is a leuco fluoran dye.

26. A method for labeling an optical disk as in claim 24, wherein the black leuco dye is a halide-containing isobenzofuranone leuco dye.

27. A method for labeling an optical disk as in claim 24, wherein the black leuco dye is selected from the group consisting of:

a)

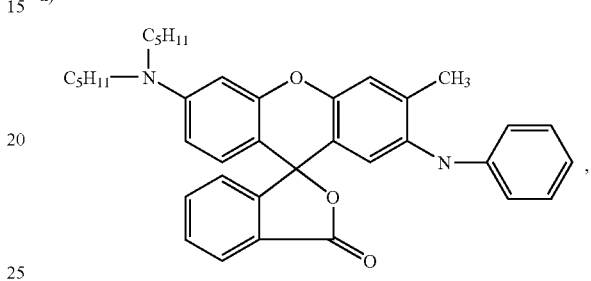

b)

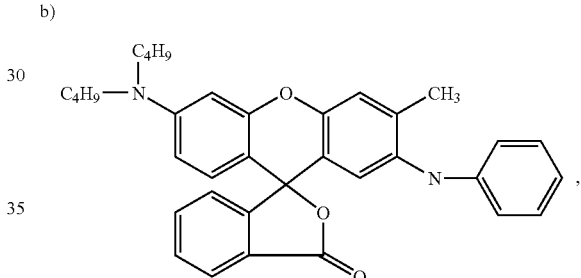

c)

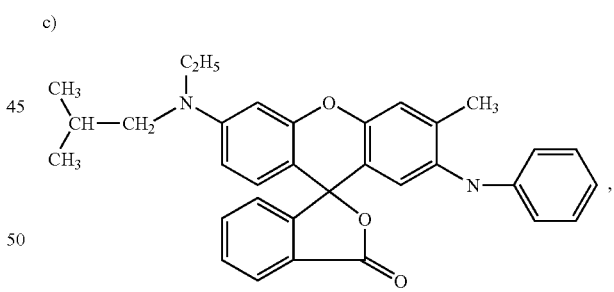

d)

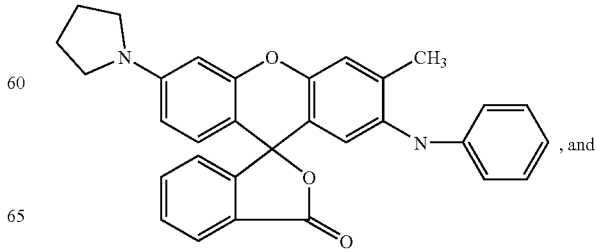

-continued e)

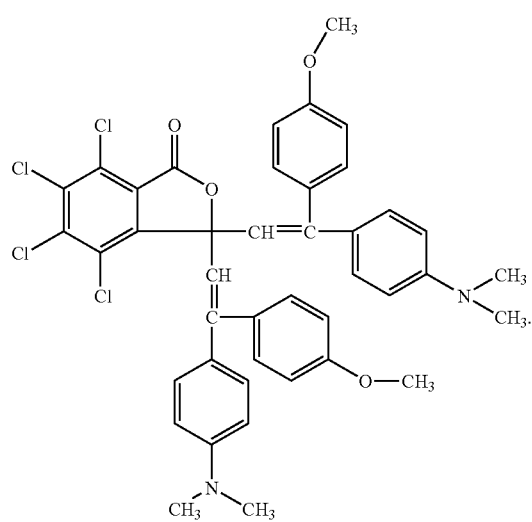

28. A method for labeling an optical disk as in claim 24, wherein the electromagnetic radiation sensitive composition is formed of adjacent layers including a leuco dye-containing layer and an absorber-containing layer.

29. A method for labeling an optical disk as in claim 24, wherein the electromagnetic radiation sensitive composition is formed of an admixture of leuco dye and absorber.

30. A method for labeling an optical disk as in claim 24, further comprising the step of recording or reading data on the optical disk simultaneously with the step of inducing the color change.

31. A method for labeling an optical disk as in claim 24, wherein the step of transferring image data further comprises digitizing the data to correspond to a spiral path that matches the path followed by the electromagnetic radiation source with respect to the top surface of the optical disk when spinning.

32. A method for labeling an optical disk as in claim 24, wherein the predetermined frequency is within a range selected from the group consisting of visible, infrared, ultraviolet, and combinations thereof.

33. A method for labeling an optical disk as in claim 24, wherein the radiation intensity is from 15 to 100 mW.

34. A method for labeling an optical disk as in claim 24, wherein the radiation time is less than about 500 microsec/spot.

35. A method for labeling an optical disk as in claim 34, wherein the radiation time is less than about 100 microsec/spot.

36. A method for labeling an optical disk as in claim 24, wherein the electromagnetic radiation source produces laser radiation capable of producing a heat flux from about 0.05 to about 1.0 J/cm$^2$.

37. A method for labeling an optical disk as in claim 36, wherein the electromagnetic radiation source produces laser radiation capable of producing a heat flux from about 0.05 to about 0.4 J/cm$^2$.

38. A method for labeling an optical disk as in claim 24, wherein the electromagnetic radiation source produces laser radiation having a spot size from about 1 to about 200 μm.

39. A method for labeling an optical disk as in claim 38, wherein the electromagnetic radiation source produces laser radiation having a spot size from about 10 to about 60 μm.

40. A method for labeling an optical disk as in claim 24, wherein the electromagnetic radiation sensitive composition further includes a non-leuco colorant.

41. A method for labeling an optical disk as in claim 40, wherein the non-leuco colorant is a pigment.

42. A method for labeling an optical disk as in claim 24, further comprising the step of applying a background colored composition to the top surface of the optical disk prior to the step of applying the electromagnetic radiation sensitive composition.

43. A method for labeling an optical disk as in claim 24, further comprising the step of applying a protective transparent layer to the top surface of the optical disk subsequent to the step of applying the electromagnetic radiation sensitive composition.

* * * * *

UNITED STATES PATENT AND TRADEMARK OFFICE
CERTIFICATE OF CORRECTION

PATENT NO. : 7,270,865 B2
APPLICATION NO. : 10/365186
DATED : September 18, 2007
INVENTOR(S) : Makarand P. Gore It is certified that error appears in the above-identified patent and that said Letters Patent is hereby corrected as shown below:

In column 8, line 22, delete "predermined" and insert -- predetermined --, therefor.

In column 13, lines 34-35, in Claim 1, delete "isobenzoffiranone" and insert -- isobenzofuranone --, therefor.

In column 13, line 36, in Claim 1, delete "lueco" and insert -- leuco --, therefor.

In column 16, line 11, in Claim 14, delete "lueco" and insert -- leuco --, therefor.

In column 16, lines 57-65, in Claim 17, delete " 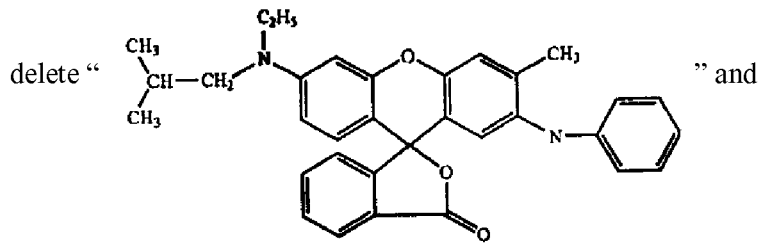 " and insert -- 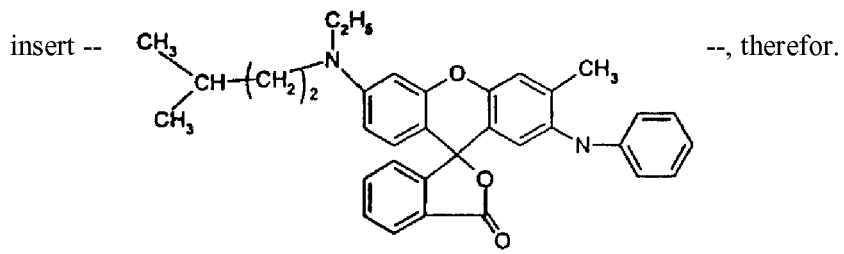 --, therefor.

UNITED STATES PATENT AND TRADEMARK OFFICE
CERTIFICATE OF CORRECTION

PATENT NO. : 7,270,865 B2  
APPLICATION NO. : 10/365186  
DATED : September 18, 2007  
INVENTOR(S) : Makarand P. Gore It is certified that error appears in the above-identified patent and that said Letters Patent is hereby corrected as shown below:

In column 18, lines 43-52, in Claim 27, delete " 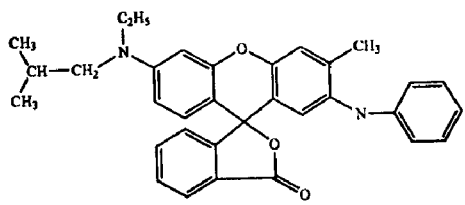 " and insert -- 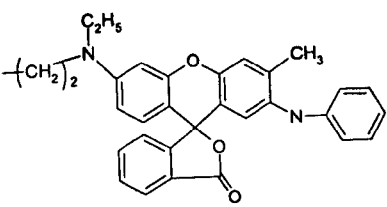 --, therefor.

Signed and Sealed this

Nineteenth Day of August, 2008

JON W. DUDAS  
*Director of the United States Patent and Trademark Office*